(12) United States Patent
Aspen

(10) Patent No.: US 7,756,629 B2
(45) Date of Patent: Jul. 13, 2010

(54) USING A ROTARY INPUT DEVICE TO FACILITATE NAVIGATIONAL CHARTING

(75) Inventor: Sven D. Aspen, Sherwood, OR (US)

(73) Assignee: The Boeing Company, Chicago, IL (US)

( * ) Notice: Subject to any disclaimer, the term of this patent is extended or adjusted under 35 U.S.C. 154(b) by 567 days.

(21) Appl. No.: 11/598,534

(22) Filed: Nov. 13, 2006

(65) Prior Publication Data

US 2008/0114537 A1 May 15, 2008

(51) Int. Cl.
*G01C 21/00* (2006.01)
(52) U.S. Cl. .................................... 701/200
(58) Field of Classification Search ................. 701/200, 701/208, 209, 211, 212
See application file for complete search history.

(56) References Cited

U.S. PATENT DOCUMENTS

2007/0268246 A1* 11/2007 Hyatt ........................ 345/156

\* cited by examiner

*Primary Examiner*—Kim T Nguyen
(74) *Attorney, Agent, or Firm*—Harness, Dickey & Pierce, P.L.C.

(57) ABSTRACT

A method of facilitating the use of a navigational chart. The method is performed by a computer including a display and a rotary input device, e.g., a mouse wheel. A view of the navigational chart is provided on the display. Movement of the mouse wheel is detected. In response to the movement, the computer uses one or more geographical locations to identify one or more points on the chart, and pans the view in the display to center in the view at least one of the one or more points. This method provides an easy, intuitive way for a pilot or other user to follow a route in a charting application.

18 Claims, 5 Drawing Sheets

USING A ROTARY INPUT DEVICE TO FACILITATE NAVIGATIONAL CHARTING

FIELD

The present disclosure relates generally to navigational charting and, more particularly (but not exclusively) to navigational charting implemented using a computer and a rotary input device such as a mouse wheel.

BACKGROUND

The statements in this section merely provide background information related to the present disclosure and may not constitute prior art.

Computer-implemented navigational charting applications are commonly used by aircraft flight crews to gather flight information and to plan flights. During flight an aircraft pilot may refer to an electronic flight box (EFB) to view a chart displaying a route to be followed by the aircraft. Where a charting application is capable of displaying one or more routes, a user of the application typically wants to examine those chart sections that display a route being planned and/or followed.

SUMMARY

The present disclosure, in one implementation, is directed to a method of facilitating the use of a navigational chart. The method is performed by a computer including a display. The computer further includes a rotary input device. A view of the navigational chart is provided on the display. Movement of the rotary input device is detected. In response to the movement, the computer uses one or more geographical locations to identify one or more points on the chart, and pans the view in the display to center in the view at least one of the one or more points.

In another implementation, the disclosure is directed to a method of facilitating the use of a navigational chart. The method is performed by a computer including a display, the computer further including a rotary input device. The method includes providing a view of the navigational chart on the display and detecting movement of the rotary input device. Based on the movement, the computer identifies one or more points of a route defined relative to the chart and pans the view in the display to center in the view at least one of the one or more identified route points.

In yet another implementation, the disclosure is directed to a navigational chart system including a computer having a display and a rotary input device. The system is configured to provide a view of a navigational chart on the display and detect movement of the rotary input device. In response to the movement, the system uses one or more geographical locations to identify one or more points on the chart and pan the view in the display to center in the view at least one of the one or more points.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

The following description is merely exemplary in nature and is not intended to limit the present disclosure, application, or uses.

In some implementations, the disclosure is directed to a method of facilitating the use of a navigational chart. The method may be performed by a computer including a display and a rotary input device, e.g., a mouse having a mouse wheel. Although various implementations of the invention are described with reference to the use of navigational charts in relation to aircraft, the invention is not so limited. Implementations also are contemplated in connection with other types of mobile platforms, including but not limited to boats, ships, trucks, automobiles and/or other vehicles. More generally, the disclosure could be implemented in various charting applications in which it may be desirable, e.g., to facilitate the display of points along a navigation route that is being planned, displayed and/or followed.

Figure 1:
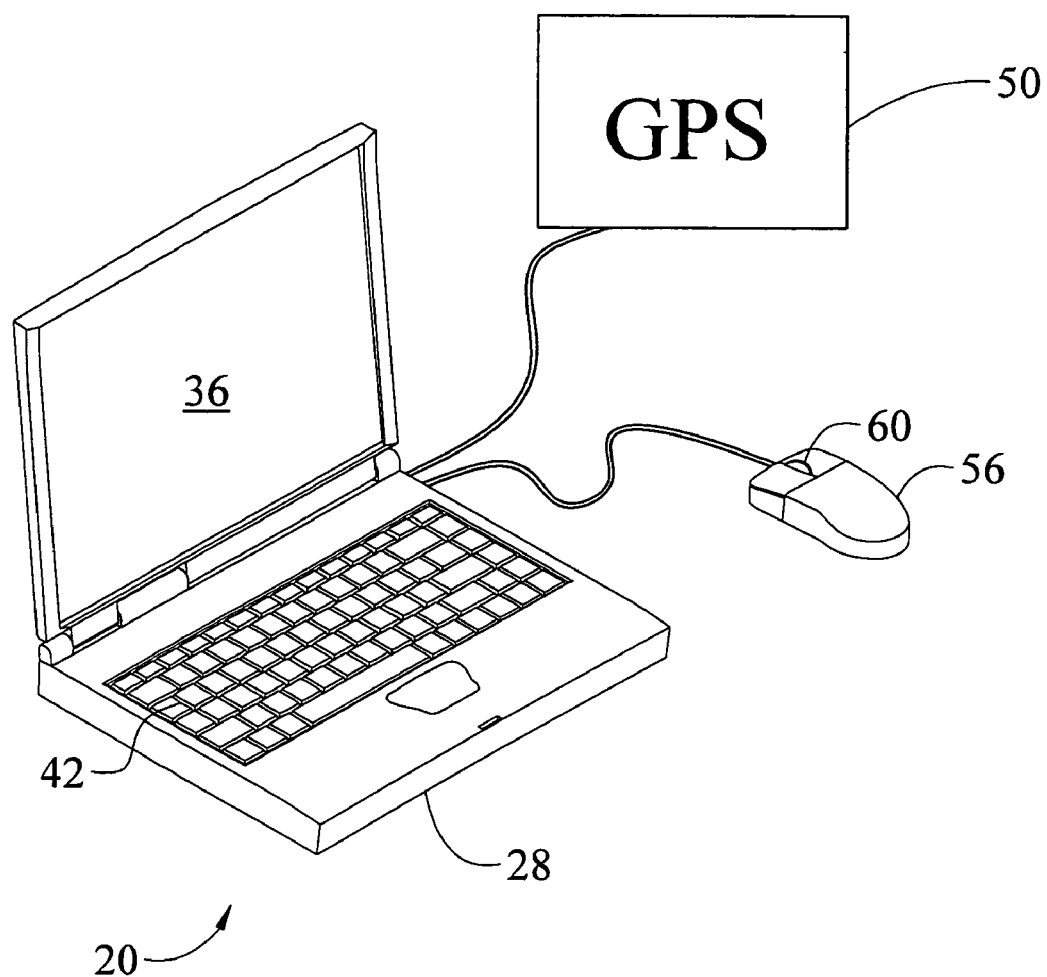
FIG. 1 is a diagram of a navigational chart system in accordance with one implementation of the present disclosure.

A navigational chart system in accordance with one implementation of the present disclosure is indicated generally in FIG. 1 by reference number 20. The system 20 includes a computer 28 including a processor and memory, a display 36, and a keyboard 42. Although in the present implementation the computer 28 is a laptop computer, in various implementations the computer 28 may be installed in a mobile platform, e.g., in the flight deck of an aircraft. In some implementations the computer 28 may have access to information from various information source(s). For example, during aircraft flight, the computer 28 may have access to information from a Global Positioning System (GPS) 50 describing a current position of the aircraft.

The computer 28 includes rotary input device, e.g., a mouse 56 having a mouse wheel 60. The wheel 60 may be scrolled in either of two directions by a user. Specifically and as known in the art, the user may use a finger to rotate the wheel 60 toward or away from himself/herself. Additionally or alternatively, the wheel 60 may be depressed by the user. It should be noted that although various implementations of the disclosure are described with reference to a mouse and mouse wheel, it is contemplated that other or additional rotary input devices could be used. For example, in some implementations a rotary input device may be a thumb roller on the control yoke of an aircraft. In various implementations, a rotary input device may be a roller included in an electronic flight bag (EFB) computer. Accordingly, references to rotation and/or depression of a mouse wheel should be construed to include activation of other or additional features available in a user-operable device to provide the same or similar functionality as set forth in this disclosure.

When a user uses the system 20 to perform a charting application, the computer 28 may provide a navigational chart on the display 36 for viewing by the user, e.g., a pilot or other flight crew member on board an aircraft. Additionally or alternatively, the system 20 may be used apart from any mobile platform, e.g., by a flight crew member on the ground to plan a navigational route.

When the computer 28 provides a navigational chart view on the display 36, the user may activate various controls, including but not limited to the mouse 56, to cause the computer 28 to pan the view in various ways. Thus the user may cause different areas of a chart to be displayed. As previously mentioned, the user may rotate the mouse wheel 60 in one of two directions or may depress the mouse wheel. The computer 28 detects movement of the mouse wheel 60. In various implementations of the disclosure, in response to the mouse wheel movement, the computer 28 uses one or more geographical locations, as further described below, to identify one or more points on the chart. The computer 28 pans the view in the display 36 to center in the view at least one of the identified points.

Figure 2:
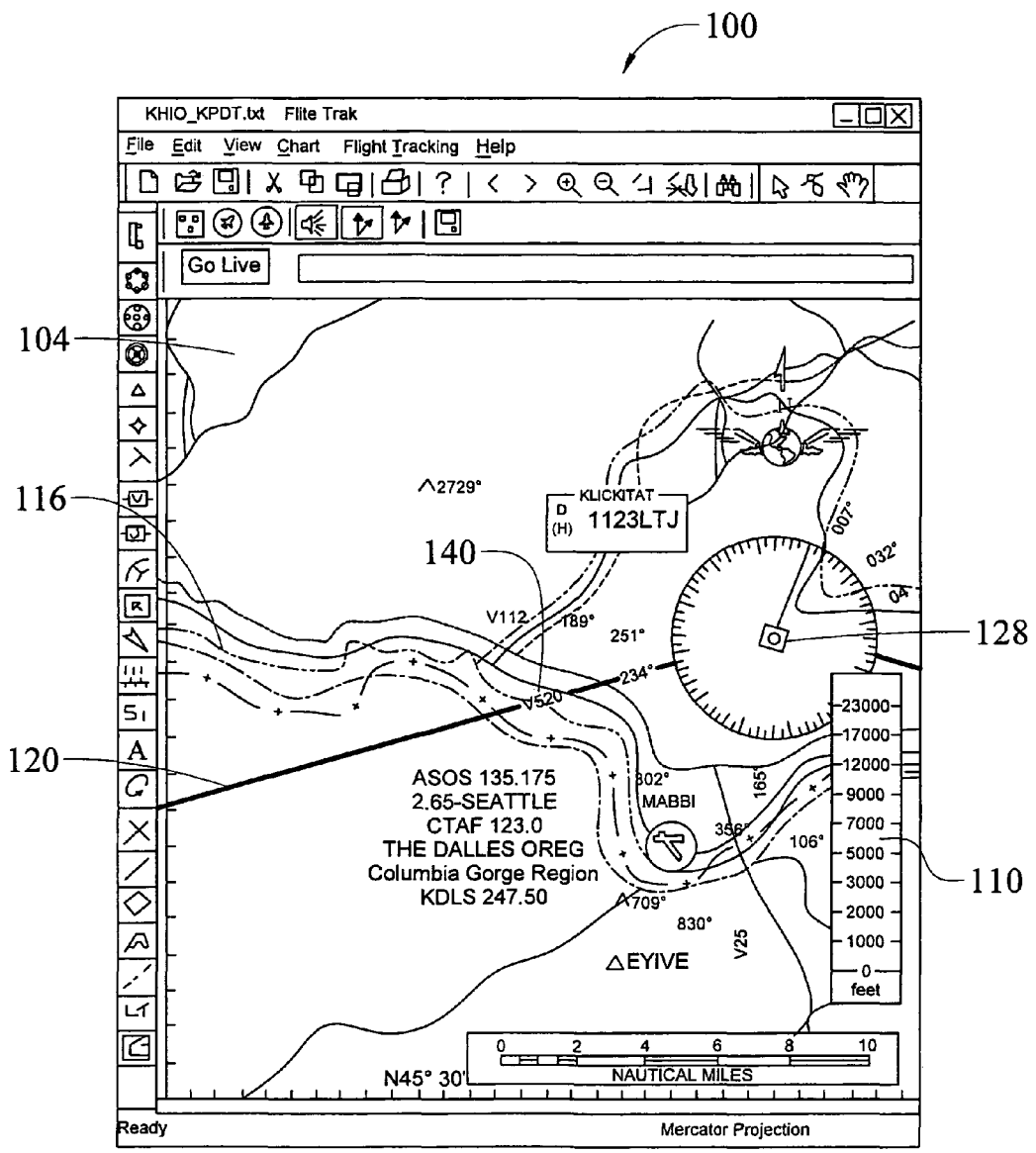
FIG. 2 is a display view of a navigational chart in accordance with one implementation of the present disclosure.

In FIG. 2 is shown a display view 100 of a navigational chart 104. The chart 104 is stored in or is otherwise available to the computer 28. The chart 104 includes coordinate information describing a geographical area, e.g., over which an aircraft is anticipated to fly. The view 100 shows, e.g., topographical information 110 and a river 116. Geographical information describing other chart features and landmarks, including but not limited to airports, is included in the chart 104 and may be shown as the view is panned in various directions as controlled by the user. As known in the art, the user may use the system 20 to plan and/or modify one or more navigation routes. For example, in the view 100 is shown part of a route 120 which is overlaid onto the chart 104. In the system 20, a navigation route is defined by a plurality of waypoints, including but not necessarily limited to a starting point and a destination point, designated by the user. Each waypoint in a route can be identified and referred to by its geographic coordinates, which may be used by the system 20, e.g., in overlaying the waypoints and route onto a chart. In the view 100, a waypoint 128 is shown. The view 100 is centered approximately about a route point 140.

Figure 3:
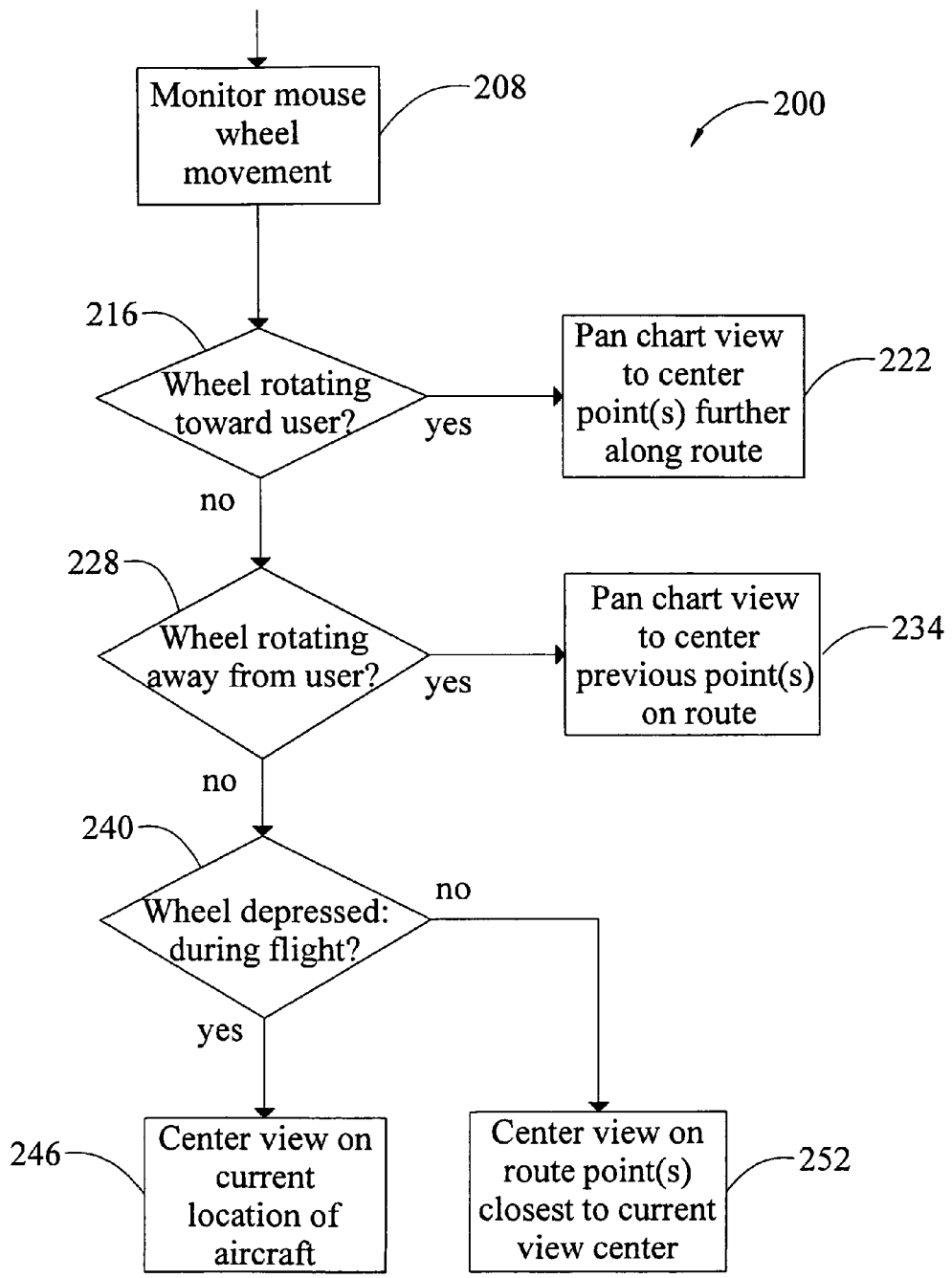
FIG. 3 is a flow diagram of a method of facilitating the use of a navigational chart in accordance with one implementation of the present disclosure.
Figure 4:
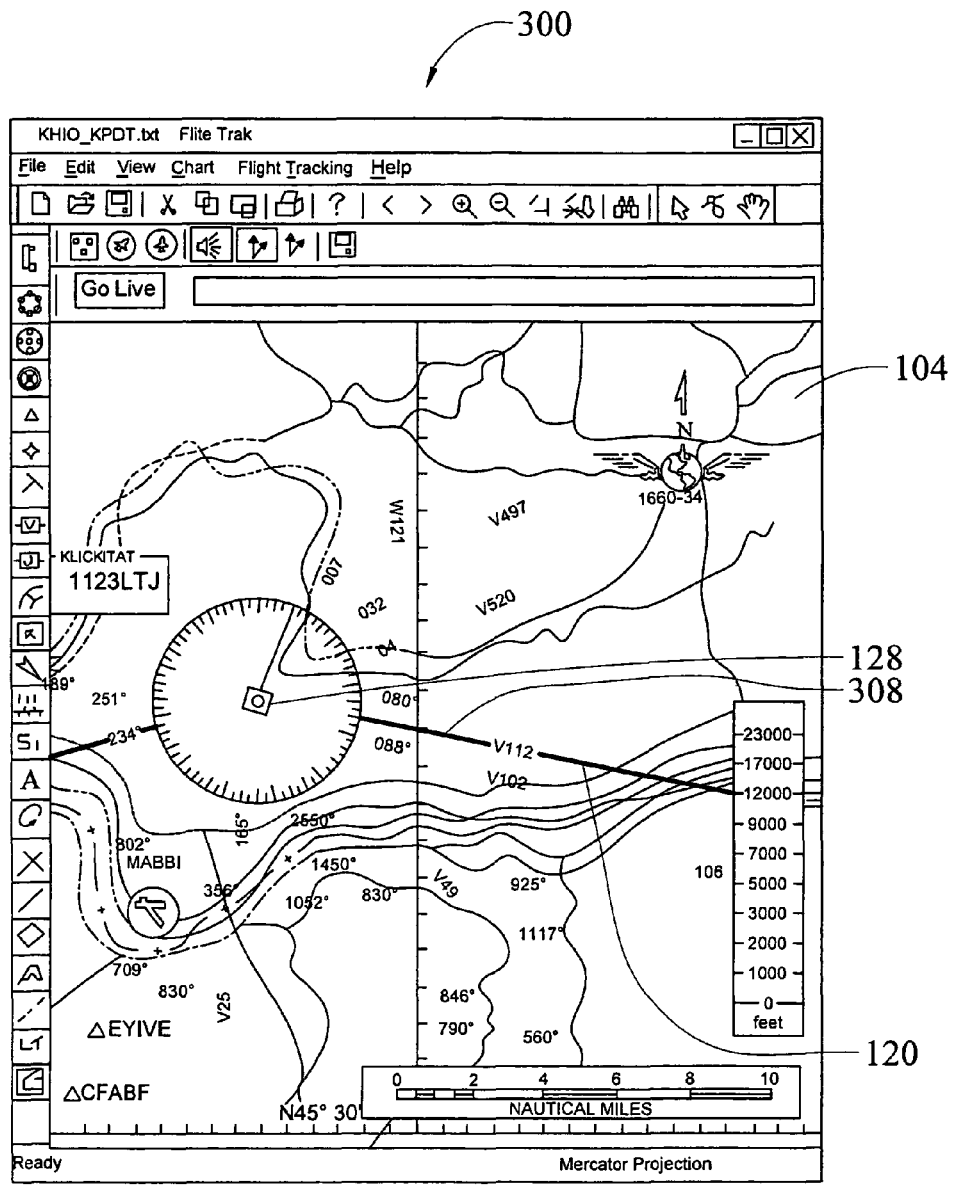
FIG. 4 is a display view of a navigational chart in accordance with one implementation of the present disclosure.

One implementation of a computer-performed method of facilitating the use of a navigational chart is indicated generally in FIG. 3 by reference number 200. The method 200 shall be described with reference to the view 100 shown in FIG. 2 and with reference to a subsequent view indicated generally in FIG. 4 by reference number 300. In step 208 the computer 28 monitors for and detects movement of the mouse wheel 60 by the user. When wheel movement is detected, in step 216 it is determined whether the wheel 60 is being rotated toward the user. If yes, then in step 222 the chart view 100 is panned, in accordance with the wheel movement, so that one or more points further along the route 120 become centered in the view. For example, as shown in the view 300, the waypoint 128 is shifted leftward and the view 300 is centered on a point 308 further along the route 120, i.e., closer to the route destination (not shown) than the point 140 previously centered in the view 100. The system 20 may continue to pan the view for as long as the mouse wheel rotational input is detected.

In one implementation the system 20 may refer to one or more route points between two waypoints to determine, e.g., direction(s) and/or distance(s) in which to pan a view. To refer to such route points, the system 20 uses coordinates based on the geographical locations of the waypoints. Such coordinates may be expressed, for example, as geographic coordinates and/or in terms relative to the two waypoints.

If in step 216 no rotation of the wheel 60 toward the user is detected, then it is determined in step 228 whether the wheel 60 is being rotated away from the user. If yes, then in step 234 the chart view is panned, in accordance with the wheel movement, so that one or more preceding points along the route 120, i.e., points closer to the beginning (not shown) of the route 120, become centered in the view.

Although the views 100 and 300 are in a "North Up" configuration, the disclosure is not limited to implementation in a "North Up" mode of operation. The disclosure may be implemented in connection with various display orientations, for example, in connection with a "Heading Up" mode, wherein a direction of travel is oriented to a top of the display 36. It should be noted that in some implementations of the disclosure in a "Heading Up" mode, a chart may be rotated in various directions as a given route takes turns in various directions.

Figure 5:
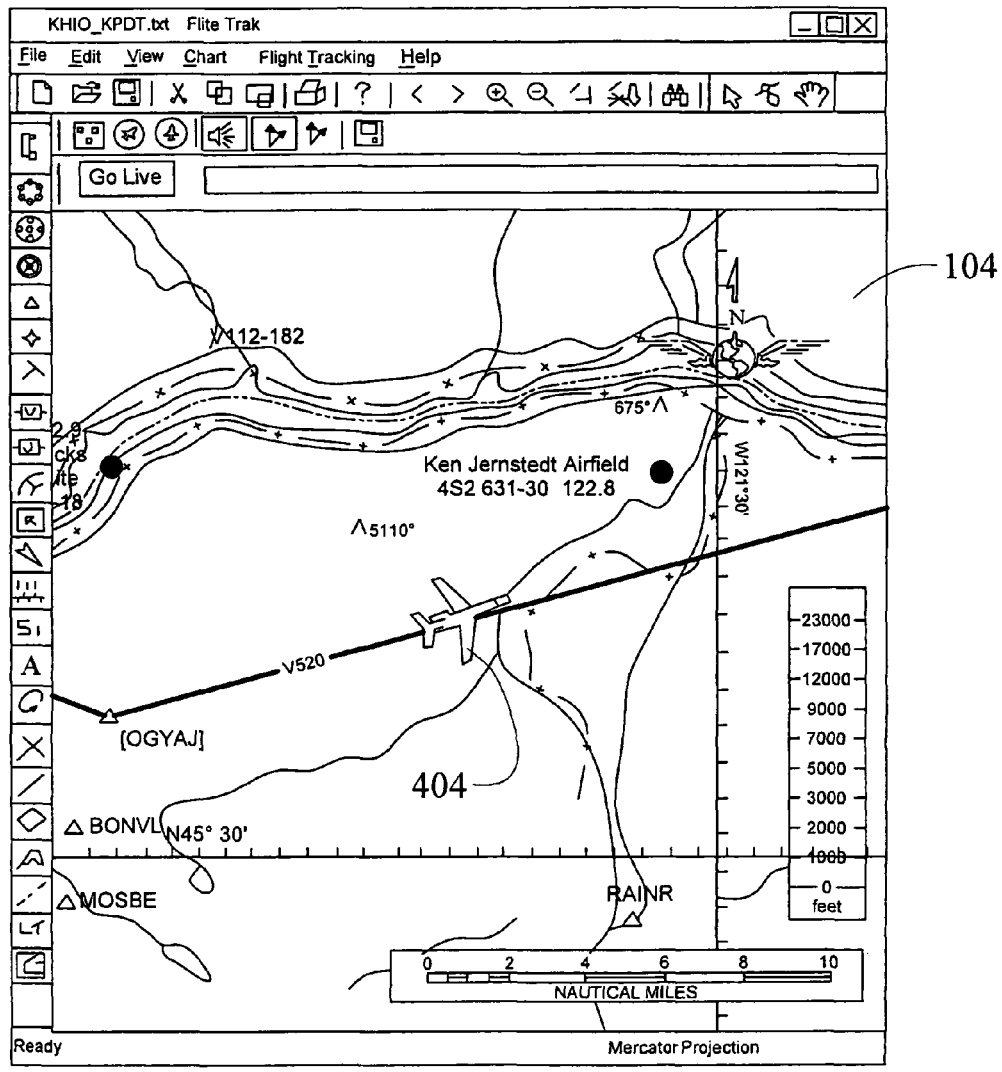
FIG. 5 is a display view of a navigational chart in accordance with one implementation of the present disclosure.

In step 240 it is determined whether the mouse wheel 60 is depressed by the user during flight. If yes, then in step 246 the system 20 uses location information from the GPS system 50 to overlay a current location of the aircraft onto the chart 104 and to center the aircraft location in the chart view. An exemplary view displaying an aircraft current location is indicated generally in FIG. 5 by reference number 400. An overlay icon 404 representing the aircraft current location is centered in the view 400 in accordance with step 246.

Referring again to FIG. 3, if it is determined in step 240 that the wheel 60 is depressed and that the system 20 is not being used during flight, then in step 252 the computer 28 determines which point on the route 120 is closest to the center of a view currently being displayed. The computer 28 then pans the view to center the closest route point in the view. Thus the user may conveniently center the route 120 in the display 36.

It should be noted that unless stated otherwise, centering one or more points in a view includes moving one or more points toward and into a central portion of a view. A view "center" thus is not limited to a single point, but may also include a central area or band of the view. What area in a view might be defined as "central" may depend on a given implementation. In some implementations, a "central" portion of a view may be a band extending horizontally across the entire view and extending vertically from a horizontal centerline of the view to include, e.g., ten percent of the total height of the view. Additionally or alternatively, in some implementations a "central" portion could extend vertically or diagonally across a view. It also is contemplated that a "central" portion could be, e.g., a central rectangle, square, circle or other shape having dimensions dependent on a given implementation. In some implementations, a "central" portion could be defined and/or adjusted with reference to particular geographic and/or other features in a chart.

It can be advantageous to limit the use of the foregoing mouse wheel functions to situations, e.g., in which it is desired to display a route in the center of a view. Thus, in various implementations, the system 20 may make one or more of the foregoing mouse wheel functions available to the user when part of a route is displayed within a predefined area of a chart view. For example, in one implementation and referring to FIG. 1, the system 20 allows the mouse wheel 60 to be activated by the user as described above when part of a route is displayed within a central portion, e.g., a central band of a selected width, e.g., twenty percent, of a current view.

Implementations of the foregoing methods make it possible for a pilot or other user to easily follow along a planned route when previewing the route within a charting application. An easy, intuitive way to follow a route is provided that requires far less user effort than would be the case where a charting application requires a user to click on arrows on the side of a display and/or drag a display.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of facilitating the use of a navigational chart, the method performed by a computer including a display, the computer further including a rotary input device, the method comprising:

overlaying a route onto the navigational chart, the route defined by a plurality of route points;

providing a view of the navigational chart on the display;

detecting movement of the rotary input device; and panning the view in the display in response to motion of the rotary input device by a user, to maintain at least a portion of the route in a central portion of the view, and further such that said panning of the view is made in accordance with the route and in accordance with rotary motion of the rotary input device.

2. The method of claim 1, the panning further comprising rotationally moving the chart and route in the view.

3. The method of claim 1, further comprising panning the view along the route in different directions based on a detected direction of rotation of the rotary input device.

4. The method of claim 1, further comprising panning the view to center a route point following a route point previously centered in the view, the panning performed in response to a first direction of rotary input device rotation.

5. The method of claim 1, further comprising panning the view to center a route point preceding a route point previously centered in the view, the panning performed in response to a second direction of rotary input device rotation.

6. The method of claim 1, wherein depression of the rotary input device is detected, the panning performed to move a route point nearest a center of the view to the center of the view.

7. The method of claim 1, the panning performed to center a point on the chart representing a current geographical location of a mobile platform on which the computer is located.

8. A method of facilitating the use of a navigational chart, the method performed by a computer including a display, the computer further including a rotary input device, the method comprising:

overlaying onto the navigational chart a route of a mobile platform defined by a plurality of route points;

providing a view of the navigational chart on the display;

detecting movement of the rotary input device; and based on input resulting from the movement:

panning the view in the display at least generally along the route, the panning performed to keep at least a portion of the route at least generally centered in the view and in one of:

a direction further along the route from a present location of the mobile platform; or a direction along the route towards one or more previous locations of the mobile platform.

9. The method of claim 8, wherein rotation of the rotary input device is detected, the method further comprising panning the view in a direction relative to the route based on a direction of the rotation of the rotary input device.

10. The method of claim 8, wherein the panning is performed to center first and second route points in the view in a sequence based on a detected direction of rotation of the rotary input device.

11. The method of claim 8, wherein depression of the rotary input device is detected, the identifying comprising identifying a route point closest to a center of the view, the panning performed to center the closest route point.

12. The method of claim 8, further comprising:

detecting depression of the rotary input device;

in response to the depression, identifying a current location of a mobile platform on which the computer is located; and panning the view to center the current location in the view.

13. The method of claim 8, wherein the panning is performed if it is determined that at least one point of the route is within a predetermined distance from the center of the view.

14. A navigational chart system comprising a computer including a display and a rotary input device, the system configured to:

provide a view of a navigational chart on the display;

overlay onto the navigational chart a route defined by a plurality of route points;

detect movement of the rotary input device; and in response to the movement, maintaining at least a portion of the route in a central portion of the view while panning the view in the display in accordance with input resulting from the movement of the rotary input device, and further such that said panning is accomplished generally in accordance with said route and in accordance with said movement of the rotary input device.

15. The system of claim 14, further configured to rotate the chart and route in the view when performing the panning.

16. The system of claim 15, wherein depression of the rotary input device is detected, the panning performed to move a route point nearest a center of the view to the center of the view.

17. The system of claim 15, further configured to pan the view in a direction relative to the route based on a detected direction of rotation of the rotary in put device.

18. The system of claim 14, the panning performed to center a point on the chart representing a current geographical location of a mobile platform on which the computer is located.

* * * * *